United States Patent [19]

Grollimund et al.

[11] 4,452,532
[45] Jun. 5, 1984

[54] BEAM ALIGNMENT TOOL AND METHOD

[75] Inventors: Everett C. Grollimund, Midlothian; Peter Martin, Richmond, both of Va.

[73] Assignee: Philip Morris Incorporated, New York, N.Y.

[21] Appl. No.: 160,625

[22] Filed: Jun. 18, 1980

[51] Int. Cl.³ .............................................. G01B 11/26
[52] U.S. Cl. .................... 356/121; 356/138; 356/154
[58] Field of Search ................ 356/121, 138, 153–154, 356/152, 399–401, 247–255; 33/286, 288, 297–298; 219/121 LU, 121 LV, 121 LW, 121 LX; 350/10

[56] References Cited

U.S. PATENT DOCUMENTS

| 1,911,645 | 5/1933 | Peterson | 356/154 |
| 3,915,575 | 10/1975 | Sick | 356/138 |
| 3,974,374 | 8/1976 | Inoue | 356/400 |

FOREIGN PATENT DOCUMENTS

| 2543377 | 4/1977 | Fed. Rep. of Germany | 356/153 |
| 2743465 | 4/1979 | Fed. Rep. of Germany | 33/286 |
| 2257902 | 8/1975 | France | 356/121 |
| 650043 | 6/1979 | U.S.S.R. | 356/138 |

OTHER PUBLICATIONS

Anninger et al., "Laser System for Determining Variations in Elevation Along a Reference Line" Western Electric Tech. DIG. #26, 4-1972, pp. 1-2.

*Primary Examiner*—William H. Punter
*Attorney, Agent, or Firm*—Arthur I. Palmer, Jr.; D. Anthony Gregory

[57] ABSTRACT

A method and apparatus for adjusting the alignment of a beam of radiant energy relative to a structure. A target is placed in the path of the beam, with an opaque reticle disposed in front of the target in the path of the beam in predetermined alignment with the structure. The beam impinges on the target to form a beam image and the reticle casts a shadow within the beam image. The positional relationship between the shadow and the outline of the beam image will be altered by any misalignment between the beam and the structure. The target is preferably chosen so that it will be permanently altered by the radiant energy of the beam, and the positional relationship between the shadow and the outline is preferably observed after exposure of the target to the beam.

17 Claims, 5 Drawing Figures

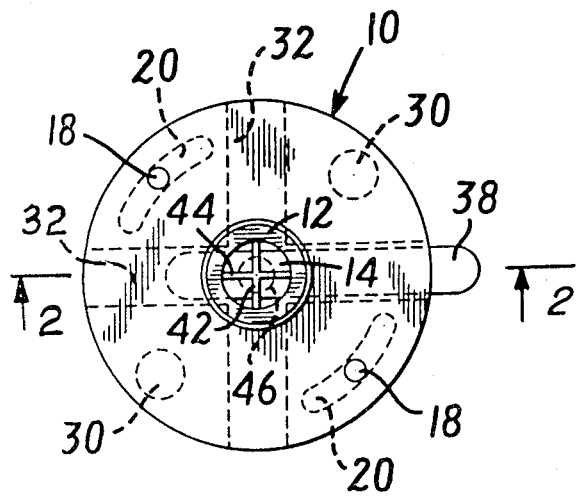
FIG. 1
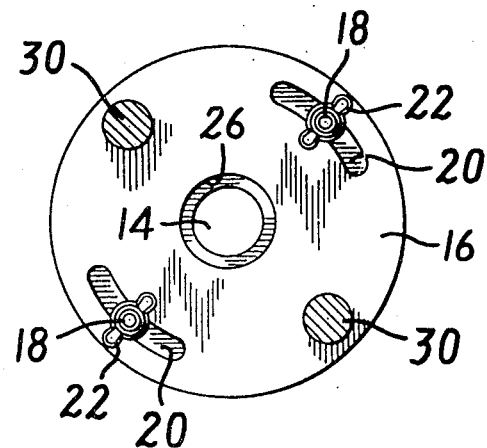
FIG. 3
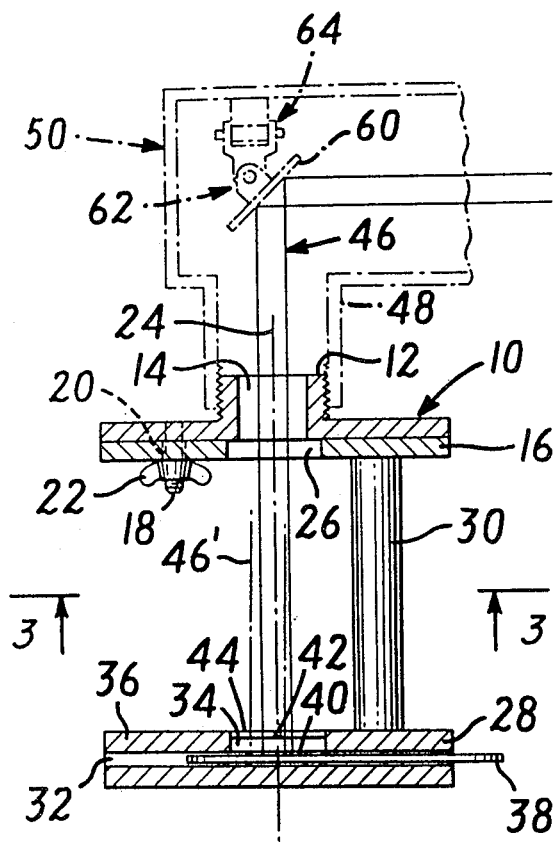
FIG. 2
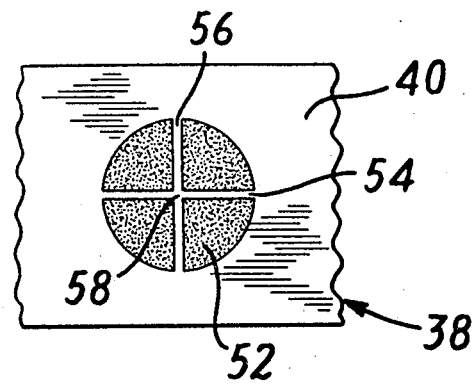
FIG. 4
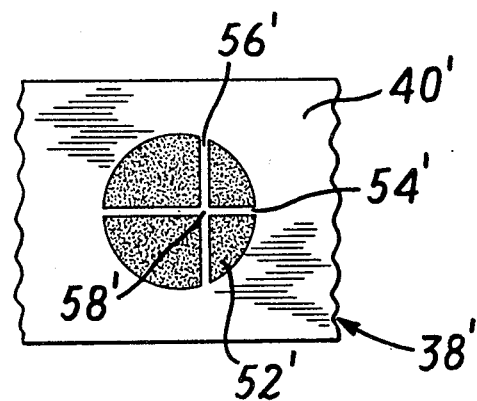

BEAM ALIGNMENT TOOL AND METHOD

BACKGROUND OF THE INVENTION

In numerous industrial applications, beams of radiant energy are utilized for treating or processing materials. It is often necessary to align these beams so that they will impinge at desired predetermined locations on the workpiece. For example, if a beam of light from a laser used to punch a hole in a piece of paper, the beam must impinge on the paper at the desired location to form the hole at the desired location.

Ordinarily, the beam is aligned with the workpiece by aligning the workpiece with the structure of the treatment apparatus and also aligning the beam with such structure. If the optical path along which the beam is routed in the apparatus includes delicate optical elements such as beam splitters, mirrors, lenses and the like, the beam may become misaligned with the structure of the apparatus, and the alignment of the beam with the structure may require periodic readjustment. The alignment between the beam and the structure must be checked for deviation from the desired alignment. If such deviation is detected, the orientation of the beam must be altered to eliminate it and the alignment of the beam with the structure is then normally rechecked to assure that the proper alignment has been achieved.

BRIEF SUMMARY OF THE INVENTION

It is an object of the present invention to provide a method and apparatus for checking the alignment between a beam of radiant energy and a structure.

It is a further object of the present invention to make such method and apparatus simple, economical, and easy to use.

In the method of the present invention, a target is positioned in the path of the beam so that the beam will impinge on the target and form a beam image. A reticle which is opaque to the radiant energy constituting the beam is positioned in front of the target in the path of the beam in predetermined alignment with the structure. Thus, the reticle will intercept a portion of the beam and will cast a shadow on the target within the beam image.

The positional relationship between the shadow and the outline of the beam image will indicate the alignment between the beam and the structure. When the beam is in the desired alignment with the structure, the shadow cast by the reticle and the outline of the beam image will be in a desired positional relationship, but this positional relationship will be altered by any deviation of the beam from the desired alignment with the structure. Using conventional measuring devices, such as calipers, micrometers or measuring microscopes, the positional relationship between the shadow and the outline of the beam image can be measured. The results of such measurement can be used to determine whether the beam is in the desired alignment with the apparatus or, if not, in which direction and by how much it should be moved.

If the beam is a continuous beam of visible light, it will produce a continuous visible image and the measurements can be taken while the beam is in existence. However, if the beam is pulsatile or if it consists of invisible radiant energy, such as infrared radiation, ultraviolet radiation, x-rays or the like, the beam image will be ephemeral or invisible. Thus, the target utilized with a pulsatile or invisible beam must be sensitive to the beam so that impingement of the beam on the target will alter it in some way which is visible or which can be made visible by subsequent processing. For example, a wooden stick can be used as a target for a powerful pulsatile beam of infrared radiation emitted by a laser; the beam will char the surface of the stick in those areas where the beam impinges upon it. The areas outside of the beam and the areas in the shadow of the reticle will remain uncharred.

Because the alignment of the shadow with the beam outline, and not the alignment of the beam outline with the target, is used to measure the alignment of the beam with the structure, there is no need to precisely align the target with the structure. The method will produce equally accurate results regardless of the position of the target relative to the structure so long as some portion of the target lies in the path of the beam. The method of the present invention is especially suited to use with axially symmetrical beams of radiant energy, although it can also be utilized with asymmetrical beams.

The apparatus of the present invention is a tool for checking an alignment between a beam of radiant energy and a structure. The tool includes target support means for holding a target in the path of the beam, a reticle opaque to the radiant energy of the beam and reticle positioning means for holding the reticle in the path of the beam in front of the target in predetermined alignment with the structure. The tool of the present invention can be utilized for practicing the alignment checking method described above.

Preferably, the reticle included in the tool includes a pair of mutually perpendicular cross hairs so that the shadow cast by the reticle will include a pair of perpendicular lines which extend to the edges of the beam image. Thus, the positional relationship between the shadow and the outline of the beam image can be gauged by measuring along each of these lines from their point of intersection to the outline of the beam image. Such measurements will provide a separate indication of the alignment of the beam relative to the structure in each of two mutually orthogonal directions.

These and other objects, features and advantages of the present invention will be more readily apparent from the following detailed description of the preferred embodiments when read in conjunction with the accompanying drawings, in which like reference numerals are used to denote like features in the various views.

BRIEF DESCRIPTION OF THE DRAWINGS

FIG. 1 is a top plan view of apparatus according to a preferred embodiment of the present invention.

FIG. 2 is a sectional view taken on line 2—2 in FIG. 1, showing the apparatus in conjunction with a typical beam handling structure during the use of the apparatus to check alignment of a beam with the structure.

FIG. 3 is a sectional view taken on line 3—3 in FIG. 2.

FIGS. 4 and 5 are fragmentary views of targets bearing beam images.

DETAILED DESCRIPTION OF THE PREFERRED EMBODIMENTS

As seen in FIGS. 1, 2 and 3, a tool according to a preferred embodiment of the present invention includes a platelike body 10 having a cylindrical threaded boss 12 extending from one side and a hole 14 which is coaxial with the boss and which extends entirely through the body. An adjusting plate 16 is held in confronting relation with the body 10 on the side opposite from the boss by a pair of studs 18 which extend from the body 10 through a pair of arcuate slots 20 in the adjusting plate and a pair of wing nuts 22 which are threadedly engaged with the studs. The arcuate slots 20 in the adjusting plate are arranged so that when the wing nuts 22 are loosened, the adjusting plate 16 may be rotated over a predetermined range about the axis 24 defined by the boss 12 of the body. However, the outside diameters of the studs 18 are only slightly less than the widths of the slots 20 so that the adjusting plate 16 cannot shift transversely of the axis 24. A hole 26 extends through the adjusting plate in alignment with the hole 14 in the body.

A holder 28 is supported from the adjusting plate 16 by a pair of standoffs 30, which are fixed to the holder and the adjusting plate. The holder is remote from the adjusting plate 16 and body 10 in the direction of the axis 24. The holder 28 has a pair of mutually perpendicular, flat, wide slots 32 which extend through it so that the length and width of each slot lie in a plane perpendicular to the axis 24. The axis 24 passes through the intersection of the slots. The holder 28 has a hole 34 which is coaxial with the axis 24 and which extends from the face 36 of the holder 28 proximal to the adjusting plate 16 to plane of the slots 32. Thus, a flat target, such as the target 38 depicted in FIGS. 1 and 2, may be inserted into either one of the slots 32 so that it extends to the axis 24. The front face 40 of the target (the face of the target which faces towards the body 10 and adjusting plate 16) will be exposed through the hole 34.

A pair of metal wires 42 and 44 are fastened to the holder 28 so that they extend in mutually perpendicular directions within the hole 34 in a plane perpendicular to the axis 24 and so that their point of intersection lies on the axis 24. The wires 42 and 44 form a reticle. The reticle will closely overlie the front surface of any target positioned in either of the slots as described above.

As seen in FIG. 2, the apparatus described above may be used to check the alignment between a beam of light 46 and a beam outlet tube 48 of a treatment structure 50. As illustrated in the drawings, the beam is axially symmetrical and circular in cross-section. In the desired alignment, the light beam 46 extends coaxially with the axis of the beam outlet tube 48.

The beam outlet tube 48 has threads at its lower end; these are ordinarily used to mount a final focusing lens (not shown). However, when the alignment is to be checked, the final focusing lens is unthreaded from the beam outlet tube 48 and the threads on the boss 12 of the checking tool body 10 are engaged with the threads of the beam outlet tube 48. Thus, the axis 24 of the beam checking tool will coincide with the axis of the beam outlet tube 48.

A flat target 38 is positioned in one of the slots 32 of the holder 28 so that it extends to the axis 24 of the alignment tool. So long as the beam 46 is anywhere near the desired alignment, a portion of the target 38 will lie in the path of the beam and the beam will pass through the hole 34 in the holder and impinge on the front face 40 of the target 38. Also, so long as the beam 46 is anywhere near the desired alignment, each of the reticle wires 42 and 44 will intercept a portion of the beam and the reticle will thus cast a shadow on the front face 40 of the target 38 within the outline of the beam image.

As seen in FIG. 2, the beam 46 is in the desired alignment; the center line of the beam 46 is coaxial with the center line of the beam outlet tube 48 and hence is coaxial with the axis 24 of the alignment tool. Thus, the beam image and the shadows cast by the reticle wires will combine to produce the pattern depicted in FIG. 4. The hatched areas 52 represent the areas upon which the beam impinges. The shadow cast by reticle wire 44 forms a first line 54 and the shadow cast by reticle wire 42 forms a second line 56 perpendicular to the first line 54. The point of intersection 58 of these two lines is exactly centered within the circular outline of the beam image. The distance from the point of intersection 58 to the edge of the beam image along either of the lines 56 or 54 in either direction from the point of intersection is equal.

If the beam 46 is misaligned with the beam outlet tube 48 when it impinges on the target, the center line of the beam will not pass through the point of intersection of the reticle wires 42 and 44. Therefore, the positional relationship between the shadow cast by the reticle and the outline of the beam image on the target will be different from that shown in FIG. 4.

For example, if the beam is misaligned with the beam outlet tube so that the beam projects slightly to the left of the beam outlet tube axis, as indicated in broken lines at 46' in FIG. 2, the pattern produced on the target will be as seen in FIG. 5. The center line of the beam will pass to the left of the point of intersection of the reticle wires 42 and 44 (FIG. 2) so that the beam image 52' on the target 40' (FIG. 5) will be displaced to the left with respect to the shadows cast by the reticle wires. In other words, the shadows cast the reticle wires will be displaced to the right with respect to the beam image. Thus, the portion of shadow line 54' lying to the right of the point of intersection 58' of the shadow lines will be shorter than the portion of shadow line 54' lying to the left of such point of intersection. This difference in length will be directly proportional to the degree of misalignment between the beam 46' and the axis of beam outlet tube 48 in the left to right direction. Of course, if the beam were misaligned with the beam outlet tube in the perpendicular direction (the direction into or out of the plane of the drawing as seen in FIG. 2) the portions of shadow line 56' on either side of the point of intersection 58' would be of unequal length.

The structure with which the beam is to be aligned may include unidirectional beam direction adjustment devices. Operation of one of these devices will deflect the beam in a first adjustment direction and operation of the other one of these devices will deflect the beam in a second adjustment direction perpendicular to the first direction. For example, the structure 50 depicted in broken lines in FIG. 2 includes a mirror 60 which is mounted to the structure by means of a first pivot 62 and a second pivot 64. If the mirror 60 is pivoted about the first pivot 62, the beam will be deflected to the left or to the right as seen in FIG. 2. If the mirror is pivoted about the second pivot 64, the beam will be deflected into or out of the plane of the drawing as seen in FIG. 2.

When the alignment tool of the present invention is utilized with a structure which incorporates such adjustment devices, it is desirable to orient the reticle wires 42 and 44 so that one of them extends in the adjustment direction of one adjustment device the other one of them extends in the adjustment direction of the other adjustment device. If this orientation is achieved, each shadow line will extend in the adjustment direction of an associated adjustment device. Thus, any inequality in the length of the segments of either shadow line will indicate the need for operation of the associated adjustment device. For example, the reticle wire 44 extends from left to right as seen in FIG. 2; the shadow line 54 cast by the reticle wire 44 extends from left to right on the front face of the target. The first pivot 62 of the structure 50 can be used to move the beam from left to right. If the segments of the shadow line 54 are of unequal length (as seen in FIG. 5) the need for operation of the first pivot 62 is clearly indicated and the amount of adjustment required will be directly proportional to the difference in length between the segments of shadow line 54 on either side of intersection point 58.

Because the body 10 of the alignment tool is engaged with the beam outlet tube 48 by means of a threaded connection, the rotational position of the body 10 about the axis of beam outlet tube 48 will be unpredictable. To achieve the desired correspondence between the directions of the reticle wires 42 and 44 and the adjustment directions of the pivots 62 and 64, the wing nuts 22 are loosened after the threaded boss 12 of the body 10 has been engaged with the beam outlet tube 48. The adjustment plate 16 and holder 28 are then rotated about the axis 24 of the alignment tool until the reticle wires extend in the desired directions and the wing nuts are tightened.

The manner in which the beam image and reticle shadow are observed will vary depending on the type of radiant energy in the beam. However, if the beam consists of brief pulses of light from a laser it will be impossible to observe the beam image and reticle shadow while the beam is in existence. Therefore, the target 38 is formed from a material which will be visibly affected by the beam. One such material is wood; ordinary tongue depressers can be used as targets when laser light of this nature is to be observed. The areas on which the beam impinges will be charred by the light, but the areas outside of the beam and the areas in the shadow of the reticle will not be charred. Therefore, after exposure of the target to the beam, the pattern of the beam image and the shadow of the reticle will be permanently recorded on the front surface of the target. The target may be removed from the apparatus after exposure and observed with suitable measuring devices.

The two slots 32 provide four possible points from which a target 38 may be inserted into the holder 28. This is quite useful when the aligning tool must be used in cramped quarters where one or more of the insertion points may be blocked.

As numerous variations and combinations of the features described above may be utilized without departing from the spirit of the present invention, the foregoing description of the preferred embodiments should be taken by way of illustration rather by way of limitation of the present invention as defined in the claims.

What is claimed is:

1. A tool for checking alignment between a beam of radiant energy and a structure comprising:
   (a) target support means for holding a target in the path of the beam so that the beam will impinge on a surface of the target and thereby form a beam image;
   (b) a reticle opaque to the radiant energy of the beam; and
   (c) reticle positioning means for holding the reticle in the path of the beam in front of the target in predetermined alignment with the structure so that the reticle will cast a shadow on the target within the beam image, the shadow and the outline of the beam image being in a first positional relationship when the beam is in the desired alignment with the structure, such positional relationship being altered by deviation of the beam from such desired alignment.

2. A tool as claimed in claim 1 in which said reticle includes a pair of perpendicularly intersecting linear elements, so that the shadow cast by the reticle will include a pair of perpendicular intersecting lines.

3. Apparatus as claimed in claim 2 wherein said reticle positioning means includes a body having a threaded feature defining an axis, said threaded feature is adapted to threadedly engage a mating feature of the structure with which the beam is to be aligned so that when the beam is in the desired alignment with such structure, the beam will extend along said axis, said reticle positioning means also includes a holder mounted to said body and pivotable about said axis, and said linearly extensive elements of said reticle are mounted to said holder so that they extend in a plane perpendicular to said axis and the orientation of said linearly extensive elements relative to said threaded feature may be adjusted by pivoting the holder relative to the body on said axis.

4. Apparatus as claimed in claim 3 wherein the elements of the reticle are fixed to the holder so that the point of intersection of such elements lies on said axis.

5. A method of checking the alignment between a beam of radiant energy and a structure comprising steps of:
   (a) positioning a target in the path of the beam and exposing the target to the beam so that the beam will impinge on a front surface of the target and form a beam image thereon;
   (b) positioning a reticle which is opaque to the radiant energy of the beam in front of the target in the path of the beam in predetermined alignment with the structure so that the reticle will cast a shadow on the target within the beam image during the exposure of the target to the beam, the shadow and the outline of the beam image being in a first positional relationship when the beam is in the desired alignment with the structure, such positional relationship being altered by deviation of the beam from such desired alignment; and
   (c) detecting the positional relationship between the shadow cast by the reticle and the outline of the beam image.

6. A method as claimed in claim 5 wherein the target is affected by the radiant energy of the beam so as to form a permanent record of the beam image, the shadow and the positional relationship between the beam image and the shadow being observed after exposure of the target to the beam.

7. A method as claimed in claim 6 wherein the target is wood and the beam is a beam of light having sufficient power to char the wood so that the beam image and the shadow are recorded in a pattern of charred and uncharred areas.

8. A method of checking the alignment between a beam of radiant energy and a structure comprising steps of:
   (a) positioning a target in the path of the beam and exposing the target to the beam so that the beam will impinge on a front surface of the target and form a beam image thereon;
   (b) positioning a reticle which includes a pair of perpendicular intersecting linearly extensive elements and which is opaque to the radiant energy of the beam in front of the target in the path of the beam in predetermined alignment with the structure so that the reticle will cast a shadow which includes a pair of perpendicular shadow lines on the target within the beam image during the exposure of the target to the beam; and (c) detecting the positional relationship between the shadow cast by the reticle and the outline of the beam image by measuring the distances from the point of intersection of the shadow lines to the edge of the beam image along each of the shadow lines.

9. A method as claimed in claim 8 in which the reticle is held so that each of its linearly extensive elements extends in the adjustment direction of a unidirectional adjustment device incorporated in the structure.

10. A method as claimed in claim 9 in which the beam is axially symmetrical, the point of intersection of the shadow lines being in the center of the beam image when the beam is in a desired alignment with the structure.

11. A method as claim in claim 10 in which the beam is circular in cross-section so that the beam image is circular.

12. A method as claimed in claim 8 wherein the target is affected by the radiant energy of the beam so as to form a permanent record of the beam image, the shadow and the positional relationship between the beam image and the shadow being observed after exposure of the target to the beam.

13. A method as claimed in claim 12 wherein the target is wood and the beam is a beam of light having sufficient power to char the wood so that the beam image and the shadow are recorded in a pattern of charred and uncharred areas.

14. A tool for checking alignment between a beam of radiant energy and a structure comprising:

(a) a target support means for holding a target in the path of the beam so that the beam will impinge on a surface of the target and thereby form a beam image;

(b) a reticle opaque to the radiant energy of the beam; and (c) reticle positioning means for holding the reticle in the path of the beam in front of the target in predetermined alignment with the structure so that the reticle will cast a shadow on the target, the shadow and the outline of the beam image being in a first positional relationship when the beam is in the desired alignment with the structure, such positional relationship being altered by deviation of the beam from such desired alignment.

15. A method for checking the alignment between a beam of radiant energy and a structure comprising steps of:

(a) positioning a target in the path of the beam and exposing the target to the beam so that the beam will impinge on a front surface of the target and form a beam image thereon;

(b) positioning a reticle which is opaque to the radiant energy of the beam in front of the target in the path of the beam in predetermined alignment with the structure so that the reticle will cast a shadow on the target during the exposure of the target to the beam, the shadow and the outline of the beam image being in a first positional relationship when the beam is in the desired alignment with the structure, such positional relationship being altered by deviation of the beam from such desired alignment; and (c) detecting the positional relationship between the shadow cast by the reticle and the outline of the beam image.

16. A method as in claim 5 further comprising the step of adjusting the beam alignment such that the observed positional relationship of step (c) coincides with the first positional relationship of step (b).

17. A method as in claim 15 further comprising the step of adjusting the beam alignment such that the observed positional relationship of step (c) coincides with the first positional relationship of step (b).

* * * * *